United States Patent
Lee

(10) Patent No.: US 10,808,841 B2
(45) Date of Patent: Oct. 20, 2020

(54) GEAR ACTUATOR FOR DOUBLE CLUTCH TRANSMISSION

(71) Applicant: Hyundai Dymos Incorporated, Seosan-si, Chungcheongnam-do (KR)

(72) Inventor: Man Bok Lee, Hwaseong-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 617 days.

(21) Appl. No.: 15/651,358

(22) Filed: Jul. 17, 2017

(65) Prior Publication Data

US 2018/0017158 A1    Jan. 18, 2018

(30) Foreign Application Priority Data

Jul. 18, 2016 (KR) .................. 10-2016-0090809

(51) Int. Cl.
| | | |
|---|---|---|
| F16H 63/30 | (2006.01) | |
| F16H 61/32 | (2006.01) | |
| F16H 61/688 | (2006.01) | |
| H01F 7/16 | (2006.01) | |
| H01F 7/08 | (2006.01) | |
| F16H 61/28 | (2006.01) | |

(52) U.S. Cl.
CPC .......... *F16H 63/304* (2013.01); *F16H 61/32* (2013.01); *H01F 7/081* (2013.01); *H01F 7/1615* (2013.01); *F16H 61/688* (2013.01); *F16H 2061/2884* (2013.01); *F16H 2063/305* (2013.01); *F16H 2063/3063* (2013.01); *H01F 2007/1692* (2013.01)

(58) Field of Classification Search
CPC ...... F16H 63/304; F16H 61/32; F16H 61/688; F16H 3061/2884; F16H 2063/305; F16H 2063/3063

USPC .................................................... 74/335
See application file for complete search history.

(56) References Cited

U.S. PATENT DOCUMENTS

| | | | | |
|---|---|---|---|---|
| 7,762,154 | B2 * | 7/2010 | Murakami | F16H 3/006 74/331 |
| 9,441,729 | B2 * | 9/2016 | Skogward | F16H 61/32 |
| 9,638,317 | B2 * | 5/2017 | Enami | F16H 61/32 |
| 10,113,641 | B2 * | 10/2018 | Kang | F16H 19/04 |

FOREIGN PATENT DOCUMENTS

| | | |
|---|---|---|
| CN | 1336292 A | 2/2002 |
| CN | 101985978 A | 3/2011 |
| KR | 2011-0011250 A | 2/2011 |
| KR | 2014-0051502 A | 5/2014 |

OTHER PUBLICATIONS

KIPO Search Report from KR 10-2016-0090809, dated Oct. 26, 2017.
Chinese Office Action for corresponding Chinese Application No. 201710586522.8, dated Oct. 31, 2018.

* cited by examiner

*Primary Examiner* — Ha Dinh Ho
(74) *Attorney, Agent, or Firm* — Harness, Dickey & Pierce, P.L.C.

(57) ABSTRACT

Disclosed herein is a gear actuator for a double clutch transmission. A power pack module is formed of a select solenoid, a shift motor, and a controller. Therefore, a wiring is omitted, so that defects pertaining to the wiring can be prevented, and the structure of the gear actuator is compact. Various parts can be used in common so that the production cost and the part management cost can be reduced.

11 Claims, 9 Drawing Sheets

GEAR ACTUATOR FOR DOUBLE CLUTCH TRANSMISSION

CROSS-REFERENCE TO RELATED APPLICATION(S)

This application claims priority to Korean Patent Application No(s). 10-2016-0090809, filed on Jul. 18, 2016, the disclosure of which is incorporated herein by reference in its entirety.

BACKGROUND OF THE INVENTION

Field of the Invention

Embodiments of the present invention relate to a gear actuator for a double clutch transmission, and more particularly, to a gear actuator configured to perform a select and shift operation in a double clutch transmission.

Description of the Related Art

A double clutch transmission (DCT) is a kind of automatic manual transmission (AMT) configured to automatically perform a gearshift operation (select and shift operation) of a manual transmission. To embody an independent gearshift operation of each of an odd-numbered stage and an even-numbered stage, an actuator and a controller configured to control the operation of the actuator are provided for each of the odd-numbered stage and the even-numbered stage.

FIG. 1 is a rear view illustrating a gear actuator for a DCT in accordance with a conventional technique. FIG. 2 is a bottom view of FIG. 1. As shown in FIGS. 1 and 2, the conventional gear actuator for a DCT includes an odd-numbered stage select solenoid 1, an odd-numbered stage shift motor 2, an even-numbered stage select solenoid 3, an even-numbered stage shift motor 4, a control shaft assembly 5 which is mechanically coupled to the solenoids and the motors and configured to select and shift a lug of a shift rail, and a housing 6 in which the above-mentioned parts are installed.

Therefore, the control shaft assembly 5 is operated by the solenoid and the motor of each of the odd-numbered stage and the even-numbered stage so that an independent gearshift operation (select and shift) of each of the odd-numbered stage and the even-numbered stage can be embodied.

The solenoids 1 and 3 and the motors 2 and 4 are respectively connected to controllers (not shown) by individual wirings 7a, 7b, 8a, and 8b to supply electric power and transmit a control signal. The individual wirings 7a and 7b of the solenoids 1 and 3 are integrated into one wiring, and the individual wirings 8a and 8b of the motors 2 and 4 are integrated into one wiring. Each integrated wiring is coupled to the corresponding controller (not shown) by a connector 7c, 8c.

However, because the wirings are coupled to the solenoids and the motors by fusing, defective connection is frequently caused. Because installation space of the gear actuator is limited, the wirings may be excessively bent. In this case, disconnection of the wirings may be caused by tensile stress.

Furthermore, in the conventional gear actuator for the DCT, since the length of the solenoid is greater than that of the motor, the rear surfaces of the solenoids and the motors are not disposed on the same plane. The solenoids and the motors are angled to each other rather than being parallel to each other, so that the operational directions thereof differ from each other. Therefore, it is difficult to modularize the solenoids and the motors along with the controllers to remove the wirings. In addition, because the operational directions of the solenoids and the motors differ from each other, they are vulnerable to vibration.

As shown in FIG. 3, in the conventional solenoid (because the select solenoids of the odd-numbered stage and the even-numbered stage are the same as each other, the select solenoid of only the odd-numbered stage is illustrated), a first coil 1a for push and a second coil 1b for pull are controlled in an on/off manner such that a single coil takes complete charge of a push or pull operation. Thus, to generate a sufficient amount of magnetic force, the coil must be relatively long. Hence, there is no alternative but for the entire length of the solenoid to increase. In the drawings, reference numeral 1c denotes a plunger which is moved in a push or pull direction when a magnetic field is formed around the coil. Reference numeral 1d denotes a select rod which integrally moves with the plunger 1c to transmit push or pull operating force to a connection part (select lever).

Furthermore, the solenoid and motor of the odd-numbered stage and the solenoid and motor of the even-numbered stage are disposed in separate regions, rather than being disposed in the same region. This structure makes modularization difficult.

As such, because an electrically-powered unit (the select solenoid and the shift motor) and a controller are not modularized, a plurality of wirings must be used. Thus, the above-mentioned wiring-related problem is caused. In addition, due to a large number of parts, the number of manufacturing processes is increased, whereby there is a problem of degradation of assemblability and productivity.

SUMMARY OF THE INVENTION

An object of the present invention is to provide a gear actuator for a double clutch transmission in which an electrically-powered unit and a controller are modularized so that there is no need of a separate wiring, whereby the problems of disconnection or defective connection of wirings are solved, a compact structure is provided, and thanks to a reduction in the number of parts, not only can the assemblability and productivity be increased but the part production and management costs can also be reduced.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a gear actuator for a double clutch transmission may include: an odd-numbered stage power pack module and an even-numbered stage power pack module each comprising a select solenoid, a shift motor, and a controller directly attached to the select solenoid and the shift motor; a body housing in which the odd-numbered stage power pack module and the even-numbered stage power pack module are installed; and a control shaft assembly coupled to the power pack modules in the body housing and configured to transmit a select and shift operation force to a lug of a shift rail.

The select solenoid and the shift motor of each of the power pack modules may be installed parallel to each other.

Respective rear ends of the select solenoid and the shift motor of each of the power pack modules may be disposed on the same plane.

The select solenoid and the shift motor of the odd-numbered stage power pack module and the select solenoid and the shift motor of the even-numbered stage power pack module may be axisymmetrically disposed.

The controller may be applied in common to the odd-numbered stage power pack module and the even-numbered stage power pack module.

The select solenoid may include a single coil for forming a magnetic field, wherein the coil may be divided into two parts spaced apart from each other, and the two parts may have respective opposite winding directions.

The select solenoid may include a plunger provided in an inner hole of a bobbin around which the coil is wound, and the plunger may be a permanent magnet.

A direction in which current is supplied to the coil may be switched by the corresponding controller.

The control shaft assembly may include an odd-numbered stage control shaft and an even-numbered stage control shaft which are coupled to each other in a double-pipe structure. A shift finger member may be fixed to each of the control shafts, and the shift finger member of each of the odd-numbered stage and the even-numbered stage may be moved in a vertical direction by one end of a select lever configured to be rotated by the corresponding select solenoid and be rotated in a circumferential direction by a nut of a lead screw configured to be operated by the corresponding shift motor.

A pair of select guides facing each other in the vertical direction may protrude from an outer circumferential surface of the shift finger member of each of the odd-numbered stage and the even-numbered stage, and the end of the select lever may be inserted between and stopped by the select guides.

A pair of shift guides facing each other in a front-rear direction may protrude from an outer circumferential surface of the nut of the lead screw, and a shift finger protruding from the select guide may be inserted between and stopped by the shift guides.

The select guide and the shift finger of each of the odd-numbered stage and the even-numbered stage may protrude toward a mechanical part coupled to the corresponding power pack module.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Reference will now be made in detail to various embodiments of the present invention, specific examples of which are illustrated in the accompanying drawings and described below, since the embodiments of the present invention may be variously modified in many different forms. However, this is not intended to limit the present invention to particular modes of practice, and it is to be appreciated that all changes, equivalents, and substitutes that do not depart from the spirit and technical scope of the present invention are encompassed in the present invention. The size of each element, the thickness of lines indicating the element, etc. may be exaggerated for the purpose of clarity and convenience of description The terms and words used for elements in the description of the present invention are determined based on the functions of the elements in the present invention. The terms and words may be changed depending on the intention or custom of users or operators, so that they must be defined based on the whole content of the present specification.

Hereinafter, an embodiment of the present invention will be described in detail with reference to the attached drawings.

Figure 1:
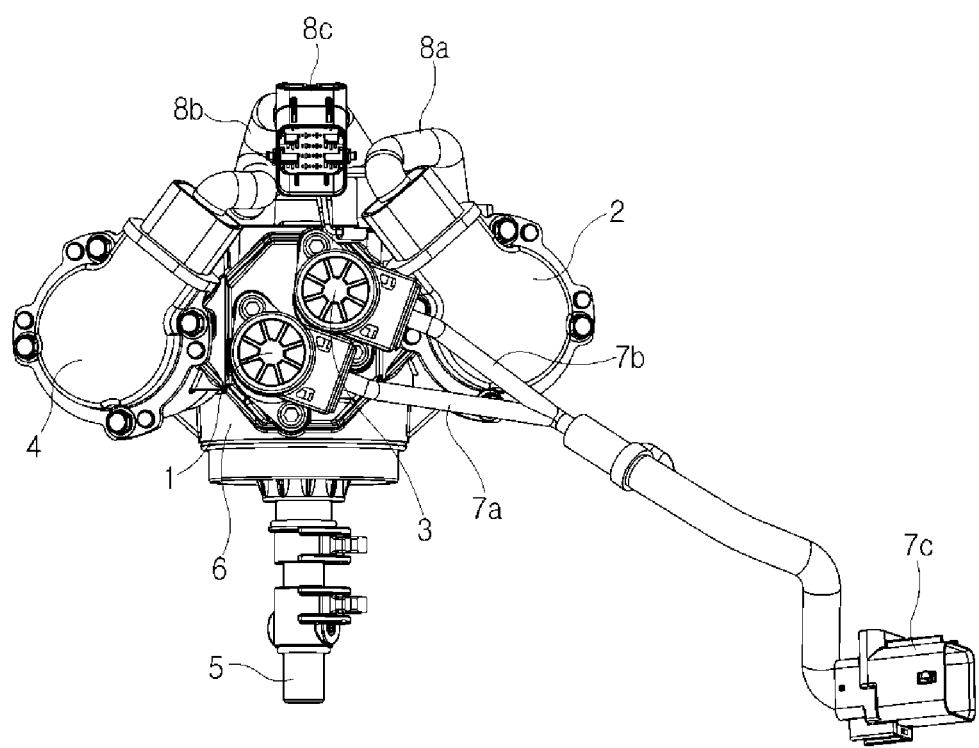
FIG. 1 is a rear view illustrating a gear actuator in accordance with a conventional technique.
Figure 2:
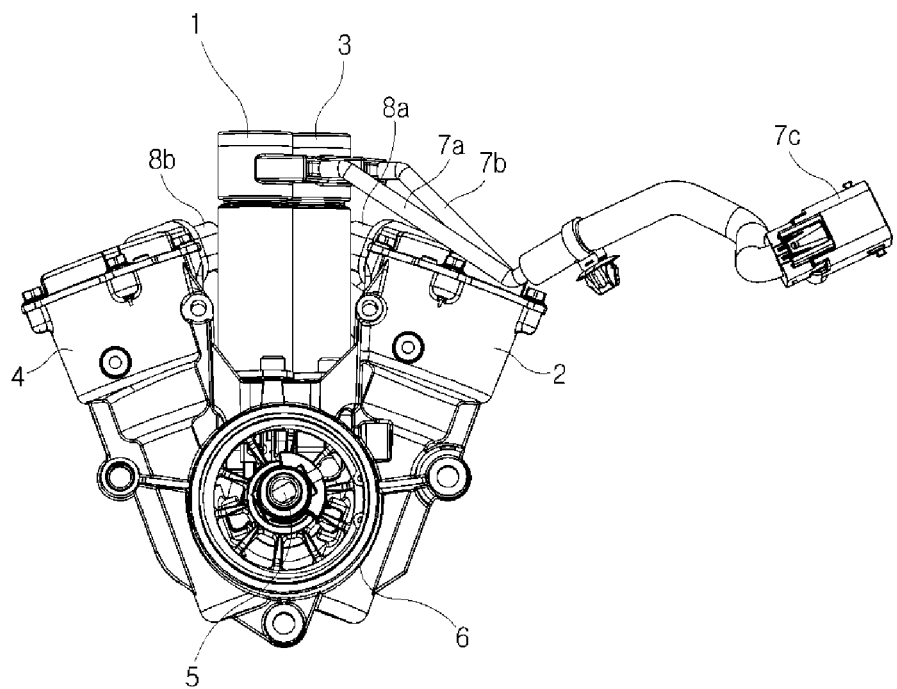
FIG. 2 is a bottom view of FIG. 1.
Figure 3:
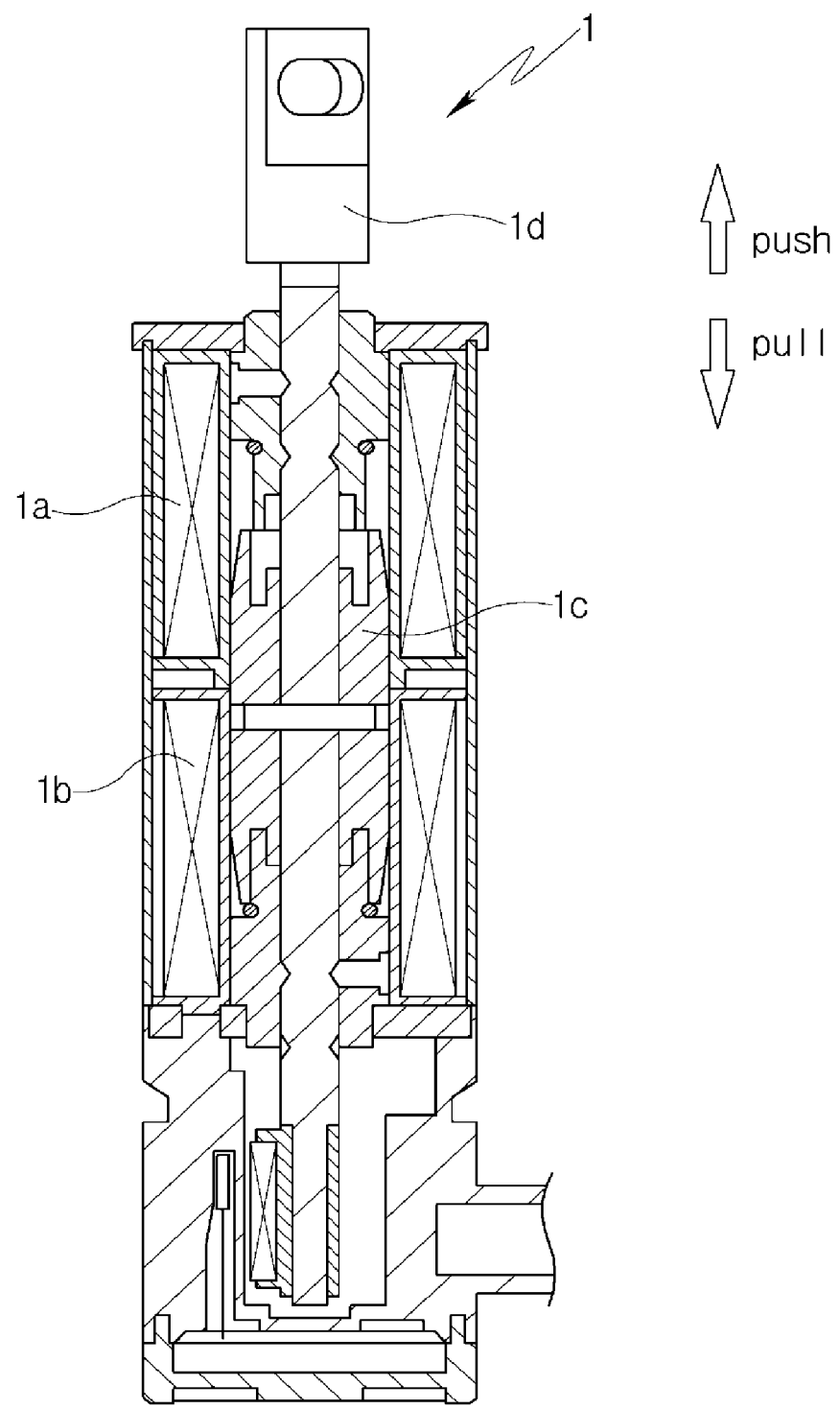
FIG. 3 is view illustrating the configuration of a select solenoid used in the conventional gear actuator.
Figure 4:
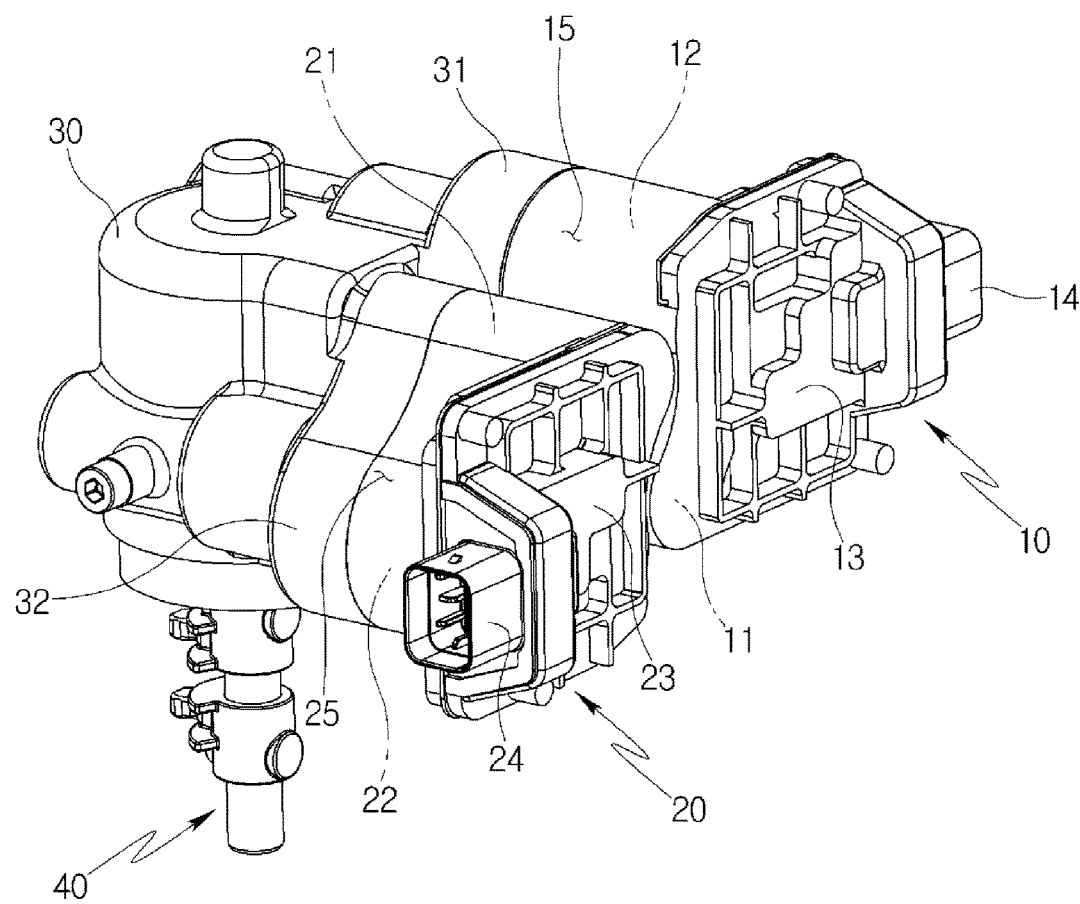
FIG. 4 is a rear perspective view illustrating a gear actuator in accordance with the present invention.
Figure 5:
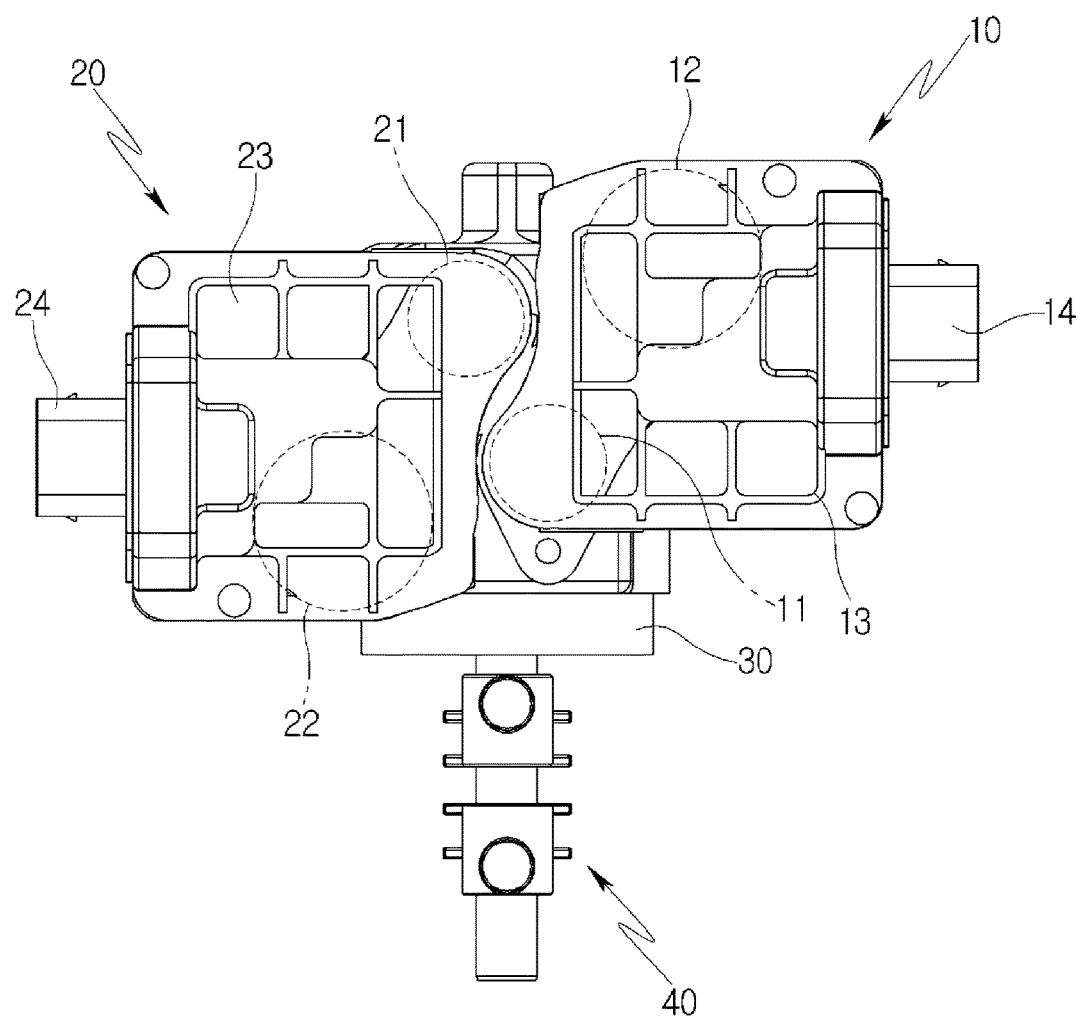
FIG. 5 is a rear view of FIG. 4.
Figure 6:
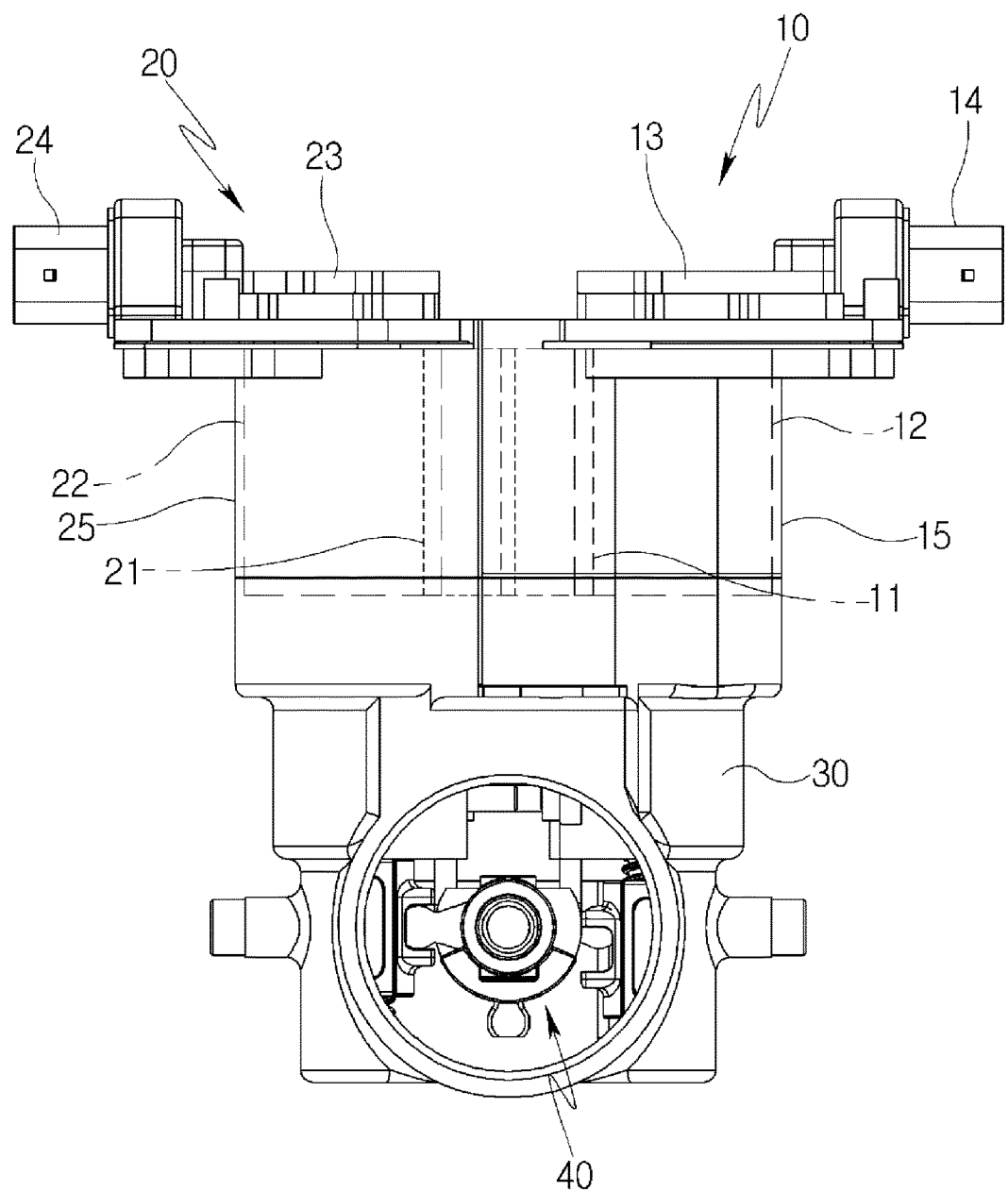
FIG. 6 is a bottom view of FIG. 5.

As shown in FIGS. 4 to 6, a gear actuator for a double clutch transmission in accordance with the present invention includes: an odd-numbered stage power pack module 10 and an even-numbered stage power pack module 20 in which controllers 13 and 23 are directly attached to respective select solenoids 11 and 21 and respective shift motors 12 and 22 of an odd-numbered stage and an even-numbered stage; a body housing 30 in which the odd-numbered stage power pack module 10 and the even-numbered stage power pack module 20 are installed; and a control shaft assembly 40 which is coupled to the power pack modules 10 and 20 in the body housing 30 and configured to select and shift a lug of a shift rail.

In the odd-numbered stage power pack module 10 and the even-numbered stage power pack module 20, the respective select solenoids 11 and 21 and the respective shift motors 12 and 22 of the odd-numbered stage and the even-numbered stage are installed in power pack housings 15 and 25. The respective controllers 13 and 23 of the odd-numbered stage and the even-numbered stage are mounted to rear surfaces of the power pack housings 15 and 25. Connectors 14 and 24 are mounted to the respective controllers 13 and 23 to embody wiring connection for transmitting a gear shift knob manipulation signal of a driver to the controllers 13 and 23.

As described above, in the gear actuator in accordance with the present invention, an electrically-powered unit (the select solenoid and the shift motor) and the controller of each of the odd-numbered stage and the even-numbered stage are modularized into a single power pack.

In each of the power pack modules 10 and 20, the select solenoid 11, 21 and the shift motor 12, 22 are installed in the power pack housing 15, 25 such that central axes thereof are parallel to each other.

Furthermore, the select solenoid 11, 21 has a reduced length and thus is installed such that rear surfaces (rear ends) of the select solenoid 11, 21 and the shift motor 12, 22 are disposed on the same plane.

Therefore, in each power pack module 10, 20, the controller 13, 23 can be directly attached to the rear surfaces (rear ends) of the select solenoid 11, 21 and the shift motor 12, 22. In other words, power terminals and signal terminals of the select solenoid 11, 21 and the shift motor 12, 22 can be directly connected to a power terminal and a signal terminal of the controller 13, 23.

Not only the control shaft assembly 40 but also mechanical elements configured to couple the control shaft assembly 40 to the select solenoids 11 and 21 and the shift motors 12 and 22 are installed in the body housing 30. Hence, it is not preferable that the installation positions of the select solenoids 11 and 21 be in the body housing 30 to align the rear ends of the select solenoids 11 and 21 and the shift motors 12 and 22 with each other.

Figure 7:
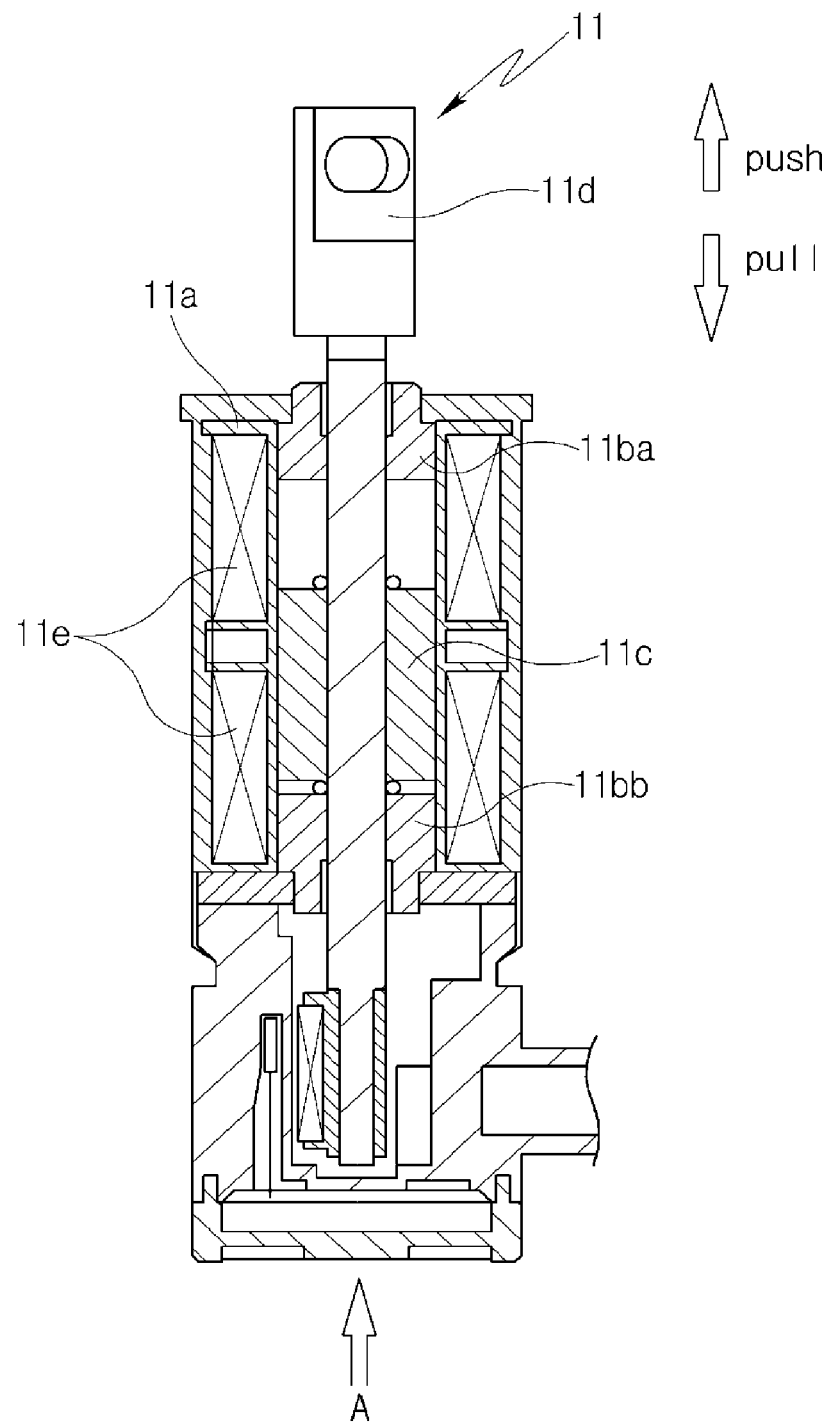
FIG. 7 is view illustrating the configuration of a select solenoid used in the gear actuator in accordance with the present invention.

Therefore, in the present invention, the rear ends of the select solenoid 11, 21 and the shift motor 12, 22 are aligned with each other by reducing the length of the select solenoid 11, 21. To achieve the foregoing purpose, as shown in FIG. 7 (because the select solenoids of the odd-numbered stage and the even-numbered stage are the same as each other, the select solenoid of only the odd-numbered stage is illustrated), the select solenoid 11 includes: a bobbin 11a; cores 11ba and 11bb which are provided in respective opposite ends of an inner hole of the bobbin 11a and configured to concentrate magnetic flux; a plunger 11c installed in the inner hole of the bobbin 11a so as to be movable in opposite directions (push and pull directions); a select rod 11d which is inserted into a through hole of the plunger 11c and fixed to the plunger 11c so that the select rod 11d moves along with the plunger 11c; and a coil 11e wound around an outer circumferential surface of the bobbin 11a. In an embodiment, the coil 11e may be divided into two parts spaced apart from each other, and the two parts of the coil 11e are wound in directions opposite to each other. For example, in the case where the coil disposed at a first side is wound in a clockwise direction when viewed from the arrow A, the coil connected therefrom and disposed at a second side is wound in a counterclockwise direction. The plunger 11c is a permanent magnet and has opposite polarities on the respective opposite ends thereof.

The select solenoid 11 is configured such that the positions of the plunger 11c and the select rod 11d are controlled to a push position or a pull position (between two positions) by switching the direction of the supply of current (converting the current supply direction to the opposite direction). The switching of the current supply direction can be embodied by the controller 13, 23 that is directly attached to the corresponding select solenoid 11, 21.

In the select solenoid 11, 21, when current is applied to the coil 11e, the opposite cores 11ba and 11bb are magnetized to the same polarity because the winding directions of the two parts of the coil 11e are opposed to each other.

Therefore, depending on the polarity direction of the plunger 11c that is a permanent magnet, attractive force is applied between one core and the plunger 11c, and repulsive force is applied between the other core and the plunger 11c. This state can be converted to the opposite state by controlling the current supply direction to the opposite direction. In other words, when the current supply direction is converted to the opposite direction, the polarity of the cores disposed on the opposite sides is converted to the same opposite polarity. Thus, repulsive force is applied between the plunger and the core disposed at the first side, and attractive force is applied between the plunger and the core disposed at the second side.

Therefore, the plunger 11c is moved in a direction in which it is pulled by the attractive force and pushed by the repulsive force. Thereby, the select rod 11d fixed to the plunger 11c is operated.

As such, because the plunger 11c can be moved to any one of the opposite directions depending on the current supply direction, it is possible to move the select rod 11d in the push direction or the pull direction. Particularly, since opposite directional forces (attractive force and repulsive force) are applied to the respective opposite ends of the plunger 11c, the plunger 11c can be further strongly moved.

In this way, although the single coil 11e is used to move the plunger 11c, the magnetic field applied to the coil 11e is divided into two parts, and the two parts of the magnetic field are applied in the opposite directions, whereby the operational force of the plunger 11c can be markedly enhanced. Consequently, with the coil shorter than that of the conventional technique, the same level of operational force can be generated. Due to the reduced length of the coil 11e, the length of the select solenoid 11, 21 can be reduced.

Figure 8:
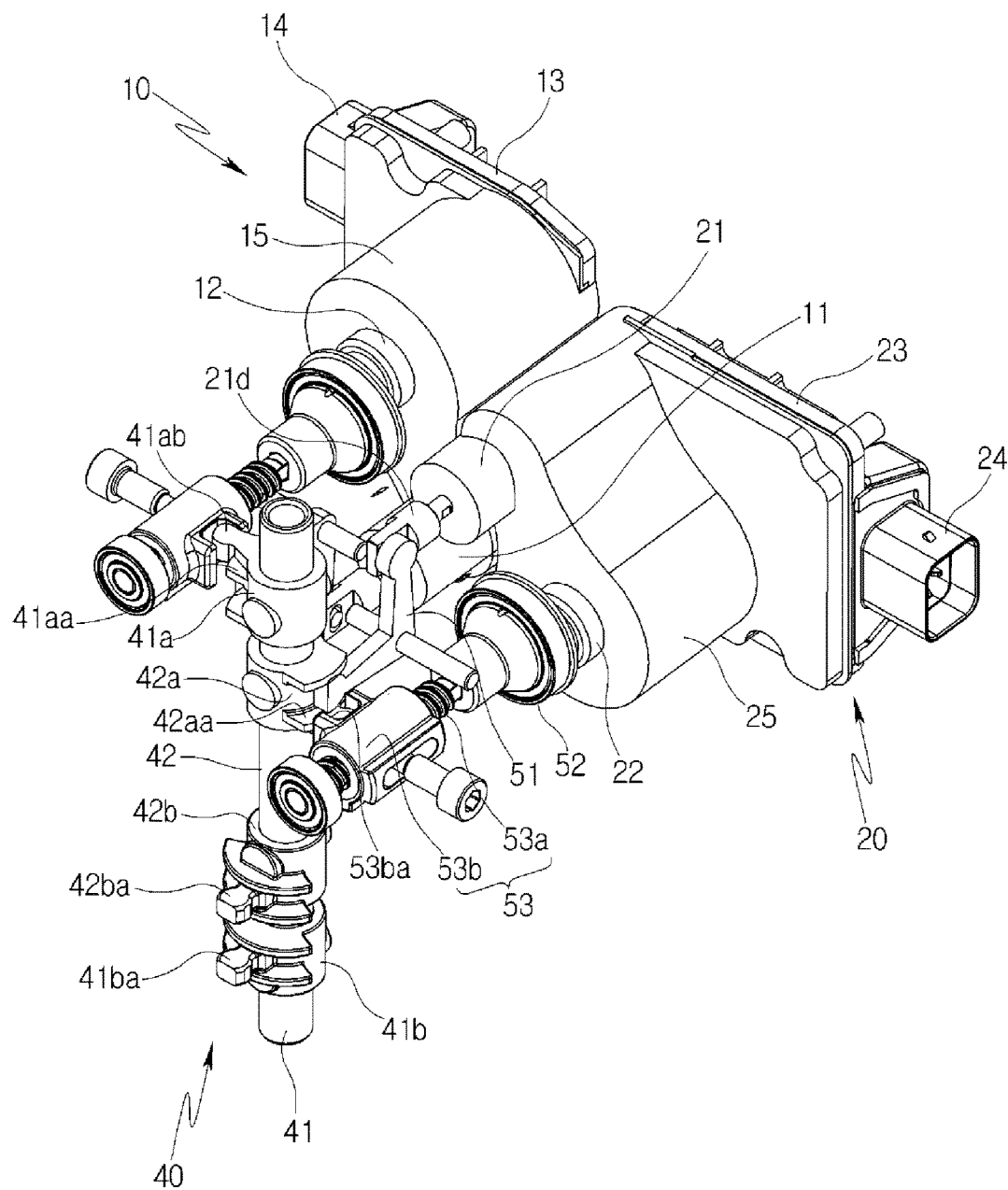
FIG. 8 is a front perspective view of FIG. 4 from which a body housing has been removed to illustrate the structure of a mechanical part.

As shown in FIGS. 5 and 8, the select solenoid 11 and the shift motor 12 of the odd-numbered stage, and the select solenoid 21 and the shift motor 22 of the even-numbered stage are disposed to form an axisymmetric structure and, more particularly, have a rotational phase difference of 180°, as shown in the drawings.

Furthermore, the select solenoids 11 and 21 and the shift motors 12 and 22 are disposed with the same positional relationship in the corresponding power pack modules 10 and 20.

In other words, the odd-numbered and even-numbered stage power pack modules 10 and 20 have the same configuration and structure, and the power pack modules 10 and 20 that are installed in the body housing 30 have only a rotational phase difference of 180° when viewed from the rear view.

The odd-numbered and even-numbered stage power pack modules 10 and 20 are mounted to power-pack-module mounting parts 31 and 32 formed on the rear surface of the body housing 30. The power-pack-module mounting parts 31 and 32 have the same appearances as those of the power pack housings 15 and 25 of the power pack modules 10 and 20 so that they form the same contour when assembled with each other.

Furthermore, output ends (select rods and rotating shafts) of the select solenoids 11 and 21 and the shift motors 12 and 22 that protrude from front surfaces of the power pack housings 15 and 25 are inserted into the body housing 30.

The control shaft assembly 40 has a double pipe structure including an odd-numbered stage control shaft 41 and an even-numbered stage control shaft 42 into which the odd-numbered stage control shaft 41 is inserted. The inner odd-numbered stage control shaft 41 is longer than the outer even-numbered stage control shaft 42, so that opposite ends of the odd-numbered stage control shaft 41 protrude outward from opposite ends of the even-numbered stage control shaft 42. Each control shaft 41, 42 is coupled at a first end thereof (based on the drawing, the upper end disposed in the body housing 30) with a shift finger member 41a, 42a. A second end (based on the drawing, the lower end disposed outside the body housing 30) of each control shaft 41, 42 is coupled with a control finger member 42a, 42b.

Figure 9:
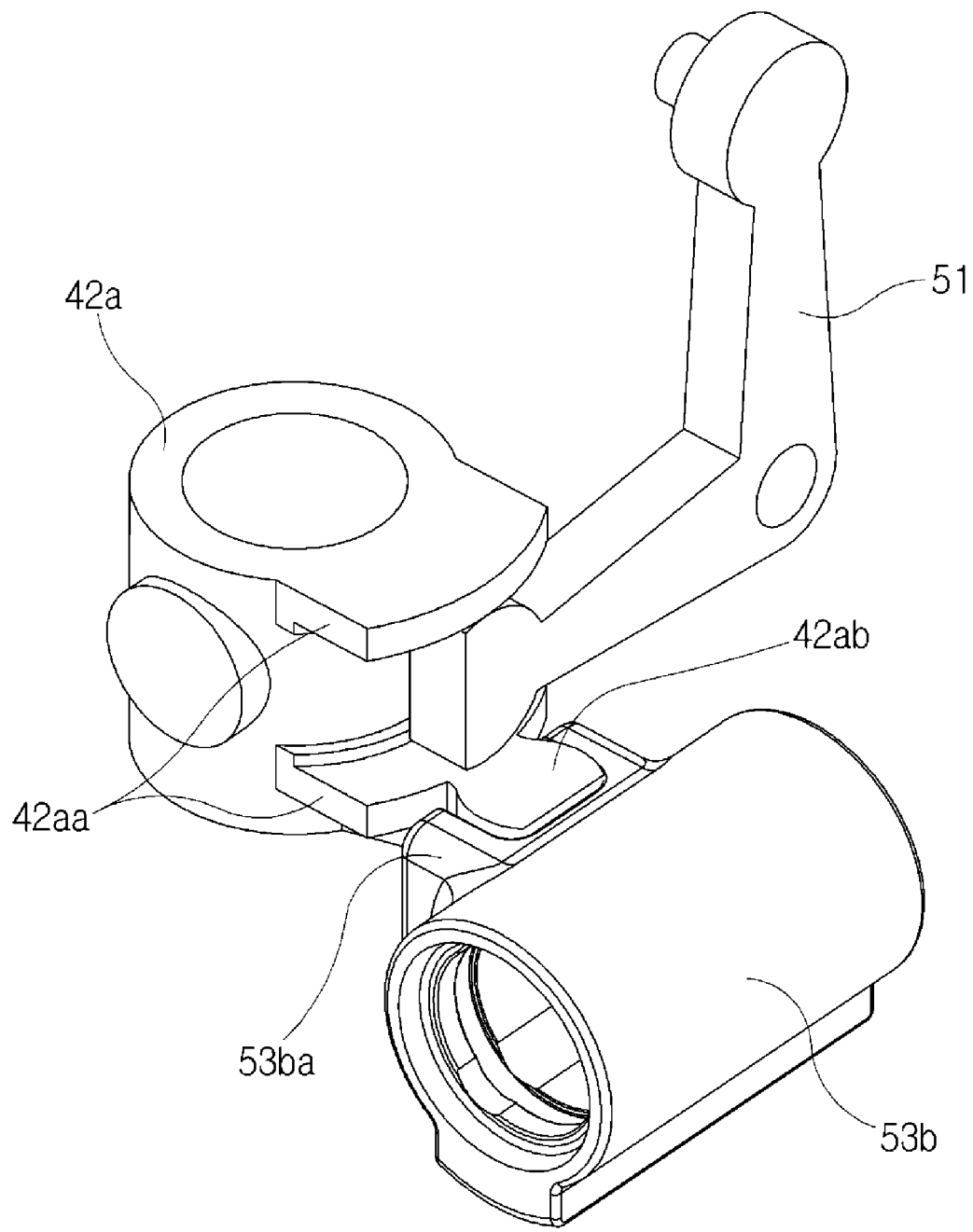
FIG. 9 is an assembled view of a select lever, a select guide member, and a lead screw nut in accordance with the present invention.

The coupling structure between the control shaft assembly 40 and the output ends of the select solenoids 11 and 21 and the shift motors 12 and 22 in the body housing 30 will be described with reference to FIGS. 8 and 9 (likewise, because the coupling structures of the odd-numbered stage and the even-numbered stage are the same as each other, there will be described the case of the even-numbered stage that is clearly illustrated in the drawings, and the coupling structure of the odd-numbered stage will be omitted).

A first end of an L-shaped select lever 51 is rotatably coupled to a select rod 21c of the select solenoid 21. A second end of the select lever 51 is installed such that it can move the shift finger member 42a of the control shaft 42 upward or downward.

Facing each other, a pair of select guides 42aa respectively protrude from upper and lower ends of an outer circumferential surface of the shift finger member 42a. The end of the select lever 51 is disposed between and stopped by the select guides 42aa.

In addition, a shift finger 42ab radially protrudes from an outer circumferential surface of one of the select guides 42aa.

A reduction gear device 52 is coupled to a rotating shaft (not shown) of the shift motor 22. A screw 53a of a lead screw 53 is coupled to an output end of the reduction gear device 52. A pair of shift guides 53ba protrude toward the control shaft assembly 40 from an outer circumferential surface of a nut 53b, which is installed in a shape enclosing the screw 53a. The shift guides 53ba are provided to face each other in a front-rear direction (in a direction in which the nut 53b operates on the lead screw 53). The shift finger 42ab is inserted between and stopped by the shift guides 53ba.

Therefore, when the select solenoid 21 operates, the select rod 21d moves forward or rearward. Thereby, the select lever 51 rotates around the central axis of the select lever 51 in a clockwise or counterclockwise direction, so that a first end of the select lever 51 pushes the corresponding select guide 42aa upward or downward. Thus, the control shaft 42 along with the shift finger member 42a is moved upward or downward. In addition, the control finger member 42b is integrally moved upward or downward. Consequently, a control finger 42ba is disposed in a depression of a selected one of lugs of the shift rail.

Thereafter, when the shift motor 22 operates, the rotating force thereof is reduced in speed by the reduction gear device 52 before being outputted. Thus, the screw 53a coupled to the output end of the reduction gear device 52 rotates in a normal direction or a reverse direction. Thereby, the nut 53b is moved forward or backward along the screw 53a.

Therefore, the shift finger 42ab inserted into the shift guide 53ba of the nut 53b is moved forward/backward so that the shift finger member 42a is rotated. Thereby, the control shaft 42 is rotated, and the control finger member 42b is thus rotated. Consequently, the control finger 42ba of the control finger member 42b pulls or pushes a selected lug so that the shift rail is shifted in a direction to shift gears. In this way, the gear shift operation is performed.

In each of the odd-numbered stage shift finger member 41a and the even-numbered stage shift finger member 42a, a select guide 41aa, 42aa and a shift finger 41ab, 42ab protrude from an outer circumferential surface of the shift finger member 41a, 42a toward the corresponding power pack module 10, 20. Therefore, the select guide 41aa, 42aa and the shift finger 41ab, 42ab can be easily coupled to the select solenoid 11, 21 and the shift motor 12, 22 of the corresponding power pack module 10, 20.

Hereinbelow, the operation and effect of the present invention will be described.

In the gear actuator according to the present invention, the odd-numbered stage power pack module 10 is formed of the odd-numbered stage select solenoid 11, the odd-numbered stage shift motor 12, and the odd-numbered stage controller 13. Likewise, the even-numbered stage power pack module 20 is formed of the even-numbered stage select solenoid 21, the even-numbered stage shift motor 22, and the even-numbered stage controller 23. As such, the elements of each of the odd-numbered stage and the even-numbered stage, in particular, the select solenoid 11, 21 and the shift motor 12, 22 of each of the odd-numbered stage and the even-numbered stage, are disposed in the same region, rather than being disposed in separate regions, so as to form the power pack module 10, 20 of each of the odd-numbered stage and the even-numbered stage. Therefore, the gear actuator can have a compact structure.

Furthermore, in each power pack module 10, 20, because the rear ends of the select solenoid 11, 21 and the shift motor 12, 22 are disposed on the same plane, the controller 13, 23 can be directly attached to the select solenoid 11, 21 and the shift motor 12, 22. Therefore, a wiring and a connector which are coupled from the controller 13, 23 to the select solenoid 11, 21 and the shift motor 12, 22 can be omitted. Thereby, the problem of defect or disconnection of a connection part of the wiring can be solved, and the production cost can be reduced by a reduction in the number of parts.

Furthermore, in the power pack housing 15, 25 of each of the odd-numbered and even-numbered stage power pack modules 10 and 20, the select solenoid 11, 21 and the shift motor 12, 22 are installed such that the central axes thereof are parallel to each other. Therefore, each power pack module 10, 20 can have a compact structure, and there are advantages in terms of a reduction in vibration of the gear actuator because the operational direction of the select solenoid 11, 21 and the shift motor 12, 22 is the same as the direction in which the output ends thereof protrude.

In each select solenoid 11, 21, the single coil 11e is divided into two parts (coupled to each other into the single coil), the winding directions of which are opposite to each other. Furthermore, the direction of supply of current is switched by the corresponding controller 13, 23. The plunger 11c coupled to the select rod 11d is formed of a permanent magnet. Therefore, when current is supplied to the coil 11e, opposite magnetic fields are formed around the two parts of the coil. Thus, magnetic forces are applied to the respective opposite ends of the plunger 11c to move the plunger 11c in the same direction. Consequently, despite using the coil having a reduced length, a sufficient amount of operational force of the select rod 11d can be generated. Hence, because the lengths of the select solenoids 11 and 21 can be reduced, the select solenoid 11, 21 and the shift motor 12, 22 of each power pack module 10, 20 can be disposed on the same plane. Thus, the select solenoids 11 and 21, the shift motor 12, 22, and the controller 13, 23 can be modularized in such a way that the controller 13, 23 is directly attached to the rear ends of the select solenoid 11, 21 and the shift motor 12, 22. Furthermore, the reduction in the lengths of the select solenoids 11 and 21 contributes to realization of the compact structure of the gear actuator.

In addition, because the power pack can be modularized without using a wiring, the structure thereof can be further simplified, and the number of manufacturing processes is reduced, whereby ease of assembly and mass production can be realized.

Taking into account the entirety of the odd-numbered and even-numbered stage power pack modules 10 and 20, the select solenoids 11 and 21 and the shift motors 12 and 22 of the odd-numbered stage and the even-numbered stage are disposed to form an axisymmetric structure. That is, if the select solenoid and the shift motor of one of the power pack modules are rotated around the center axis between the opposite power pack modules, they can be symmetric with the select solenoid and the shift motor of the other power pack module. Therefore, with regard to the configuration of the power pack modules 10 and 20, a single type of controller 13, 23 can be applied to both the odd-numbered and even-numbered stage power pack modules 10 and 20. In other words, the controllers 13 and 23 can be used in common.

This is applied not only to the controller but also to the power pack module itself. In other words, the odd-numbered and even-numbered stage power pack modules 10 and 20, which are the same as each other, are installed to form axisymmetric relationship and coupled to the select and shift devices of the odd-numbered stage and the even-numbered stage, respectively. As such, the power modules can be used in common, whereby the assemblability and marketability of the gear actuator can be markedly enhanced. Furthermore, the parts constituting the odd-numbered and even-numbered stage power pack modules can be used in common. Because a large number of parts can be used in common, the part production and management cost can be markedly reduced.

In each of the odd-numbered and even-numbered stage shift finger members 41a and 42a of the control shaft assembly 40, the select guide 41aa, 42aa and the shift finger 41ab, 42ab respectively protrude in corresponding directions. In other words, the odd-numbered stage select guide 41aa and the odd-numbered stage shift finger 41ab protrude toward mechanical parts coupled to the odd-numbered stage power pack module 10. The even-numbered stage select guide 42aa and the even-numbered stage shift finger 42ab protrude toward mechanical parts coupled to the even-numbered stage power pack module 20. Therefore, the odd-numbered stage select guide 41aa and the odd-numbered stage shift finger 41ab and the even-numbered stage select guide 42aa and the even-numbered stage shift finger 42ab can be collected in respective opposite regions and coupled to the mechanical parts (the select lever and the reduction gear device) of the corresponding parts. This is also one of factors making it possible to modularize the select solenoid 11, 21, the shift motor 12, 22, and the controller 13, 23 into one power pack.

As described above, according to the present invention, the length of a select solenoid is reduced, and the select solenoid and a shift motor are disposed parallel to each other so that the rear surfaces (rear ends) of the select solenoid and the shift motor can be disposed on the same plane. Hence, a controller can be directly attached to the select solenoid and the shift motor. In other words, an electrically-powered unit (the select solenoid and the shift motor) and the controller can be modularized.

As such, the electrically-powered unit along with the controller is modularized, so that the gear actuator can have a compact structure, and there is no need of a separate connection part such as a wiring or connector (for connecting the electrically-powered unit with the controller).

Therefore, the assembly process is simple, and the number of manufacturing processes is reduced, whereby the assemblability and the productivity can be enhanced, and the part management cost is reduced.

Furthermore, because there is no need of a separate wiring, the problem of disconnection or defective connection of the wiring can be fundamentally solved.

In addition, since the select solenoid and the shift motor are disposed parallel to each other, the operational directions thereof correspond to each other. Consequently, there is an advantage in that vibrations are mitigated.

The odd-numbered stage electrically-powered unit and the even-numbered stage electrically-powered unit are disposed to have an axisymmetric structure, so that a single controller can be used in common for the odd-numbered module and the even-numbered module. As a result, the part production and management costs can be reduced.

While the present invention has been described with respect to the specific embodiments, it will be apparent to those skilled in the art that various changes and modifications may be made without departing from the spirit and scope of the invention as defined in the following claims.

What is claimed is:

1. A gear actuator for a double clutch transmission, comprising:
   an odd-numbered stage power pack module and an even-numbered stage power pack module each comprising a select solenoid, a shift motor, and a controller directly attached to the select solenoid and the shift motor;
   a body housing in which the odd-numbered stage power pack module and the even-numbered stage power pack module are installed; and
   a control shaft assembly coupled to the power pack modules in the body housing and configured to transmit a select and shift operation force to a lug of a shift rail,
   wherein the select solenoid comprises a single coil for forming a magnetic field, wherein the coil is divided into two parts spaced apart from each other, and the two parts have respective opposite winding directions.

2. The gear actuator according to claim 1, wherein the select solenoid and the shift motor of each of the power pack modules are installed parallel to each other.

3. The gear actuator according to claim 1, wherein respective rear ends of the select solenoid and the shift motor of each of the power pack modules are disposed on the same plane.

4. The gear actuator according to claim 1, wherein the select solenoid and the shift motor of the odd-numbered stage power pack module and the select solenoid and the shift motor of the even-numbered stage power pack module are axisymmetrically disposed.

5. The gear actuator according to claim 1, wherein the controllers are applied in common to the odd-numbered stage power pack module and the even-numbered stage power pack module.

6. The gear actuator according to claim 1, wherein the select solenoid comprises a plunger provided in an inner hole of a bobbin around which the coil is wound, and the plunger is a permanent magnet.

7. The gear actuator according to claim 1, wherein a direction in which current is supplied to the coil is switched by the corresponding controller.

8. The gear actuator according to claim 1, wherein the control shaft assembly comprises an odd-numbered stage control shaft and an even-numbered stage control shaft which are coupled to each other in a double-pipe structure, a shift finger member is fixed to each of the control shafts, and the shift finger member of each of the odd-numbered stage control shaft and the even-numbered stage control shaft is moved in a vertical direction by one end of a select lever configured to be rotated by the corresponding select solenoid and is rotated in a circumferential direction by a nut of a lead screw configured to be operated by the corresponding shift motor.

9. The gear actuator according to claim 8, wherein a pair of select guides facing each other in the vertical direction protrude from an outer circumferential surface of the shift finger member of each of the odd-numbered stage control shaft and the even-numbered stage control shaft, and the end of the select lever is inserted between and stopped by the select guides.

10. The gear actuator according to claim 9, wherein a pair of shift guides facing each other in a front-rear direction protrude from an outer circumferential surface of the nut of the lead screw, and a shift finger protruding from one of the select guides is inserted between and stopped by the shift guides.

11. The gear actuator according to claim 10, wherein the select guides and the shift finger of each of the odd-numbered stage control shaft and the even-numbered stage control shaft protrude toward a mechanical part coupled to the corresponding power pack module.

\* \* \* \* \*